(12) United States Patent
Setlak et al.

(10) Patent No.: US 7,599,532 B2
(45) Date of Patent: Oct. 6, 2009

(54) FINGER SENSING WITH ENHANCED MOUNTING AND ASSOCIATED METHODS

(75) Inventors: Dale R. Setlak, Melbourne, FL (US); Matthew M. Salatino, Satellite Beach, FL (US); Philip J. Spletter, Satellite Beach, FL (US); Yang Rao, Rockledge, FL (US)

(73) Assignee: Authentec, Inc., Melbourne, FL (US)

( * ) Notice: Subject to any disclaimer, the term of this patent is extended or adjusted under 35 U.S.C. 154(b) by 0 days.

(21) Appl. No.: 12/206,183

(22) Filed: Sep. 8, 2008

(65) Prior Publication Data

US 2009/0003664 A1 Jan. 1, 2009

Related U.S. Application Data

(62) Division of application No. 11/550,693, filed on Oct. 18, 2006, now Pat. No. 7,424,136.

(60) Provisional application No. 60/727,739, filed on Oct. 18, 2005.

(51) Int. Cl.
H01L 31/00 (2006.01)

(52) U.S. Cl. .................. 382/126; 382/124; 257/414; 257/E31.001

(58) Field of Classification Search ............... 382/124, 382/126; 257/414, E31.001
See application file for complete search history.

(56) References Cited

U.S. PATENT DOCUMENTS 5,887,343 A 3/1999 Salatino et al. ............ 29/833

(Continued)

FOREIGN PATENT DOCUMENTS

DE 19921231 11/2000

(Continued)

OTHER PUBLICATIONS

Ratha et al., "Automatic Fingerprint Recognition Systems, Passage"; Automatic Fingerprint Recognition Systems, New York, Springer Verlag, US, 2003, pp. 37-44; XP002414501.

(Continued)

*Primary Examiner*—Victor A Mandala
(74) *Attorney, Agent, or Firm*—Allen, Dyer, Doppelt, Milbrath & Gilchrist, P.A.

(57) ABSTRACT

A finger sensor may include a finger sensing integrated circuit (IC) having a finger sensing area, an IC carrier having a cavity receiving the finger sensing IC therein and having at least one beveled upper edge, and a frame surrounding at least a portion of an upper perimeter of the IC carrier and having at least one inclined surface corresponding to the at least one beveled upper edge of the IC carrier. The finger sensor may also include a biasing member for biasing the IC carrier into alignment within the frame. The biasing member may include at least one resilient body for biasing the IC carrier upward within the frame. In other embodiments, the finger sensor may include an IC carrier having a cavity receiving the finger sensing IC therein and having at least one laterally extending projection. The frame may surround at least a portion of an upper perimeter of the IC carrier and have at least one shoulder cooperating with the at least one laterally extending projection of the IC carrier to define at least one upward stop.

21 Claims, 7 Drawing Sheets

U.S. PATENT DOCUMENTS

| | | | | |
|---|---|---|---|---|
| 5,963,679 | A | 10/1999 | Setlak | 382/312 |
| 6,064,753 | A | 5/2000 | Bolle et al. | 382/125 |
| 6,259,108 | B1* | 7/2001 | Antonelli et al. | 250/556 |
| 6,259,804 | B1 | 7/2001 | Setlak et al. | 382/124 |
| 6,333,989 | B1 | 12/2001 | Borza | 382/124 |
| 6,347,040 | B1 | 2/2002 | Fries et al. | 361/760 |
| 6,392,143 | B1 | 5/2002 | Koshio | 174/52.4 |
| 6,504,945 | B1* | 1/2003 | Helot et al. | 382/126 |
| 6,628,812 | B1 | 9/2003 | Setlak et al. | 382/124 |
| 6,646,316 | B2 | 11/2003 | Wu et al. | 257/434 |
| 6,713,677 | B2 | 3/2004 | Fischbach et al. | 174/52.2 |
| 6,727,561 | B2* | 4/2004 | Sato et al. | 257/414 |
| 6,906,407 | B2 | 6/2005 | Byers et al. | 257/686 |
| 6,912,299 | B1 | 6/2005 | Hoshino | 382/124 |
| 6,917,695 | B2* | 7/2005 | Teng et al. | 382/126 |
| 6,924,496 | B2 | 8/2005 | Manansala | 250/556 |
| 6,950,541 | B1 | 9/2005 | Setlak et al. | 382/126 |
| 7,042,809 | B2* | 5/2006 | Mignot | 368/223 |
| 7,049,166 | B2 | 5/2006 | Salatino et al. | 438/64 |
| 7,076,089 | B2 | 7/2006 | Brandt et al. | 382/124 |
| 7,084,474 | B2 | 8/2006 | Hung et al. | 257/434 |
| 7,090,139 | B2 | 8/2006 | Kasuga et al. | 235/494 |
| 7,099,496 | B2 | 8/2006 | Benkley, III | 382/124 |
| 7,192,798 | B2* | 3/2007 | Okada et al. | 438/51 |
| 2002/0096731 | A1 | 7/2002 | Wu et al. | 257/434 |
| 2003/0048256 | A1 | 3/2003 | Salmon | 345/168 |
| 2003/0048597 | A1 | 3/2003 | Wang et al. | 361/681 |
| 2003/0224553 | A1 | 12/2003 | Manansala | 438/106 |
| 2004/0188838 | A1* | 9/2004 | Okada et al. | 257/738 |
| 2005/0031174 | A1 | 2/2005 | Ryhanen et al. | 382/124 |
| 2005/0073507 | A1 | 4/2005 | Richter et al. | 345/174 |
| 2005/0089202 | A1 | 4/2005 | Setlak et al. | 382/124 |
| 2005/0139685 | A1* | 6/2005 | Kozlay | 235/492 |
| 2005/0146054 | A1 | 7/2005 | Chu et al. | 257/783 |
| 2006/0034499 | A1* | 2/2006 | Shinoda et al. | 382/124 |
| 2006/0050935 | A1 | 3/2006 | Bustgens et al. | 382/124 |
| 2007/0086630 | A1* | 4/2007 | Setlak et al. | 382/124 |
| 2007/0086634 | A1* | 4/2007 | Setlak et al. | 382/128 |
| 2007/0133847 | A1* | 6/2007 | Ogura | 382/126 |

FOREIGN PATENT DOCUMENTS

| | | |
|---|---|---|
| EP | 0941696 | 9/1999 |
| WO | WO98/30967 | 7/1998 |
| WO | 00/68874 | 11/2000 |
| WO | 02/47018 | 6/2002 |
| WO | 2004/066194 | 8/2004 |
| WO | 2006/041780 | 4/2006 |

OTHER PUBLICATIONS

Japanese Patent Abstract 2005115836A, Alps Electric Co. Ltd, Apr. 28, 2005.

Japanese Patent Abstract 2003271937, Matsushita Electric Ind. Co. Ltd, Sep. 26, 2003.

"Validity VFS101: reliable 2D Swipe Sensor™ Fingerprint Imaging on Flexible Tape", Product Brochure, Validity, Inc. Jul. 2004, 4 pages, available at http://web.archive.org/web/20040704002508/validityinc.com/ValidityProductBrochure0404.pdf.

"Validity Sensors", Validity, Inc. Oct. 9, 2004, 7 pages, available at http://web.archive.org/web/20041009161351/wvvw.validityinc.com/index.htm.

* cited by examiner

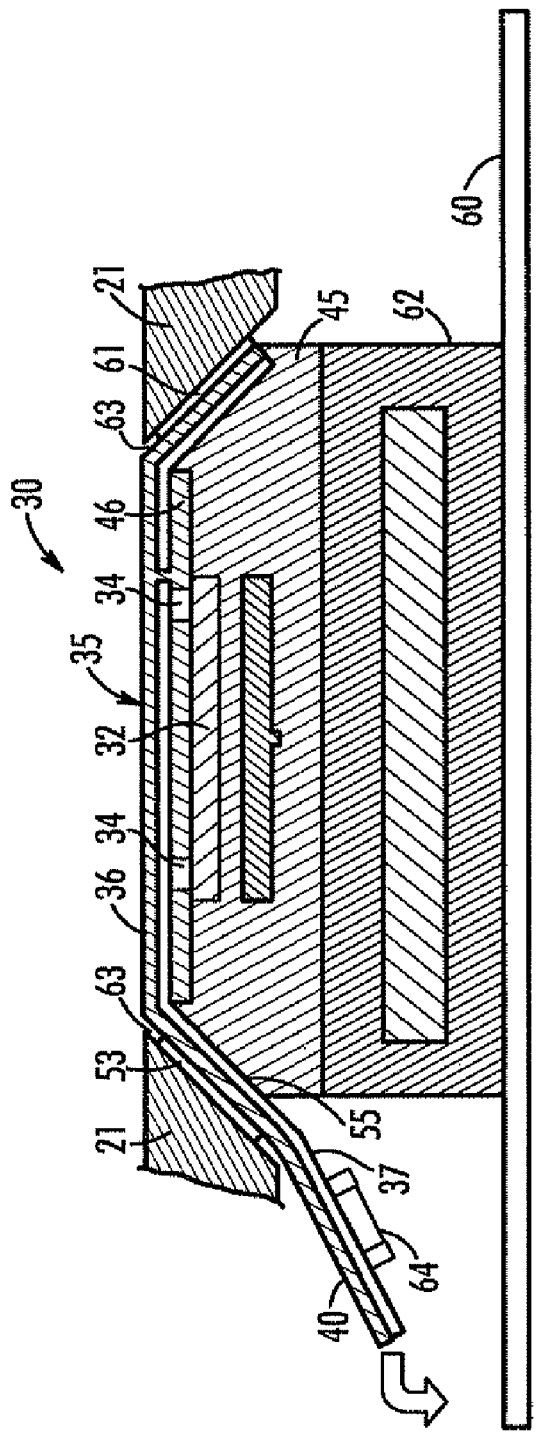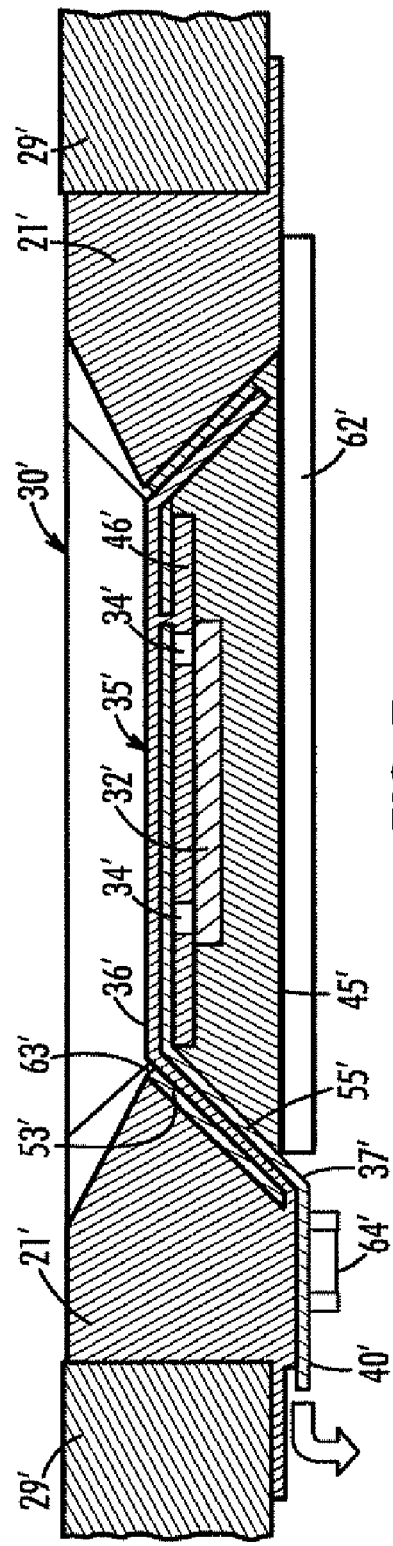

FINGER SENSING WITH ENHANCED MOUNTING AND ASSOCIATED METHODS

RELATED APPLICATION

This application is a divisional of Ser. No. 11/550,693 filed Oct. 18, 2006, now U.S. Pat. No. 7,424,136 which is based on provisional application Ser. No. 60/727,739 filed Oct. 18, 2005, the disclosures of which are hereby incorporated by reference in their entirety.

FIELD OF THE INVENTION

The present invention relates to the field of electronics, and, more particularly, to the field of finger sensors including finger sensing integrated circuits, and associated manufacturing methods.

BACKGROUND OF THE INVENTION

Sensors including integrated circuits (ICs) that directly sense the physical properties of objects in the sensor's environment have come into widespread use in electronic equipment. These ICs are desirably in close proximity to the external environments they measure, but they should not be damaged by the mechanical and/or electrical events that an external environment can apply.

One type of such sensing is finger sensing and associated matching that have become a reliable and widely used technique for personal identification or verification. In particular, a common approach to fingerprint identification involves scanning a sample fingerprint or an image thereof and storing the image and/or unique characteristics of the fingerprint image. The characteristics of a sample fingerprint may be compared to information for reference fingerprints already in a database to determine proper identification of a person, such as for verification purposes.

A particularly advantageous approach to fingerprint sensing is disclosed in U.S. Pat. Nos. 5,963,679 and 6,259,804, assigned to the assignee of the present invention, the entire contents of which are incorporated herein by reference. The fingerprint sensor is an integrated circuit sensor that drives the user's finger with an electric field signal and senses the electric field with an array of electric field sensing pixels on the integrated circuit substrate. Additional finger sensing integrated circuits and methods are disclosed in U.S. Published U.S. Patent Application No. 2005/0089202 entitled "Multi-biometric finger sensor including electric field sensing pixels and associated methods", also assigned to the assignee of the present invention, and the entire contents of which are incorporated herein by reference.

A number of prior art references disclose various types of packaging of IC sensors. For example, U.S. Pat. No. 6,646,316 to Wu et al. discloses an optical sensor including a sensing die with bond pads on an upper surface thereof. A flexible circuit board is coupled to the bond pads, and has an opening over the sensing surface. A transparent glass layer covers the opening in the flexible circuit board. U.S. Pat. No. 6,924,496 to Manansala discloses a similar flexible circuit attachment to a fingerprint sensor, but leaves the area above the surface open.

U.S. Pat. No. 7,090,139 to Kasuga et al. discloses a smart card including a fingerprint sensor having bond pads attached to wiring film, and also including a window or opening above the sensing surface. U.S. Published Patent Application No. 2005/0139685 to Kozlay discloses a similar arrangement for a fingerprint sensor.

Some fingerprint sensors are based on thin film technology, such as disclosed in U.S. Published Application No. 2006/0050935 A1 to Bustgens et al. Other fingerprint sensors may include sensing elements on a flexible substrate, such as disclosed in U.S. Pat. No. 7,099,496 to Benkley, III. These sensors may be slightly more rugged that integrated circuit based sensors, but may have performance shortcomings.

U.S. Published Patent Application No. 2005/0031174 A1 to Ryhanen et al. discloses a flexible circuit board covering an ASIC for capacitive electrode fingerprint sensing, and wherein the sensing electrodes are on the surface of the flexible substrate and covered with a thin protective polymer layer. In some embodiments, the sensor may wrap the flexible circuit around to the back side of the ASIC for attachment to a circuit board in a ball grid form.

U.S. Pat. No. 5,887,343, assigned to the assignee of the present invention, discloses an embodiment of a fingerprint sensor package that includes a transparent layer over the finger sensing area of a finger sensing IC. A chip carrier, having an opening for the sensing area, is coupled, either capacitively or electrically, to the bond pads on the IC via peripheral regions of the transparent layer.

Finger sensing ICs are currently used on some cellular telephone handsets to capture fingerprints for user identification and to capture finger motions for menu navigation. Standard IC packaging methods that completely enclose the silicon chip are not used with these sensors because the sensing fields the sensors use to measure the fingerprint (e.g., electric fields, thermal fields, etc.) do not pass effectively through the package. For these sensors in today's systems, the IC or chip is typically packaged such that the finger can directly contact the passivation layer on the chip surface during the reading operation. For protection from physical damage during storage and transport (in a pocket or purse) the handsets are typically designed to fold closed when not in operation, protecting the sensor assembly which is mounted on an inside surface of the folding device.

There are many situations, however, where it may be preferable to be able to mount the sensor on an unprotected external surface of the handset. This would allow the sensor to be used without opening the clamshell handset, and would allow IC sensors to be used on handsets that do not fold closed, such as the so-called "candy bar" phones.

Unfortunately, the use of a finger sensing IC exposed on a device's external surface will likely subject the sensor to mechanical and/or electrical stresses not seen by a sensor that has a folding cover over it during storage. For example, a device in a pocket or purse will be subject to scratching, abrasion, point impact, continuous point pressure, and shear impact forces. The packaging technologies used for sensors in closeable cases are unlikely to provide adequate protection for the silicon chip.

SUMMARY OF THE INVENTION

In view of the foregoing background, it is therefore an object of the present invention to provide a finger sensor with enhanced packaging features and related methods.

This and other objects, features and advantages in accordance with the present invention are provided by a finger sensor comprising a finger sensing integrated circuit (IC) including a finger sensing area, an IC carrier having a cavity receiving the finger sensing IC therein and having at least one beveled upper edge, and a frame surrounding at least a portion of an upper perimeter of the IC carrier and having at least one inclined surface corresponding to the at least one beveled upper edge of the IC carrier. Moreover, the finger sensor may include a biasing member for biasing the IC carrier into alignment within the frame. The biasing member may include at least one resilient body for biasing the IC carrier upward within the frame. Accordingly, the finger sensing IC may be displaced downwardly and thereafter return to its properly aligned position. This may serve to absorb blows or shocks that may otherwise damage the finger sensing IC.

In some embodiments, the IC carrier may have a generally rectangular shape, and the at least one beveled upper edge of the IC carrier may comprise four beveled upper edges. In addition, the frame may surround the upper perimeter of the IC carrier, and the at least one inclined surface of the frame may comprise four inclined surfaces. Accordingly, displacement is thereby accommodated in four directions.

The finger sensor may further comprise a flexible circuit coupled to the IC finger sensor, and extending between the IC carrier and adjacent portions of the frame. In addition, the flexible circuit may comprise at least one connector portion extending beyond the finger sensing area and the plurality of bond pads. The connector portion may comprise a tab connector portion and/or a ball grid array connector portion. At least one drive electrode may also be carried by the flexible layer.

The finger sensing IC may further comprise at least one bond pad adjacent the finger sensing area, and the flexible circuit may include a flexible layer and at least one conductive trace carried thereby and coupled to the at least one bond pad. At least one drive electrode may be carried on an outer and/or inner surface of the flexible layer. At least one electrostatic discharge (ESD) electrode may also be carried by the flexible layer. A fill material may be provided between the finger sensing IC and the flexible circuit.

The finger sensor may further include at least one electronic component carried by the flexible layer. For example, the at least one electronic component may comprise at least one of a discrete component, a light source, a light detector, and another IC. The another IC may comprise at least one other finger sensing IC, for example.

The IC finger sensor may comprise a semiconductor substrate having an upper surface. The finger sensing area may comprise an array of sensing electrodes carried by the upper surface of the semiconductor substrate, such as for electric field finger sensing, for example.

A method aspect is for making a finger sensor. The method may include providing a finger sensing integrated circuit (IC) comprising a finger sensing area; positioning the IC finger sensor into a cavity of an IC carrier having at least one beveled upper edge; and positioning a frame surrounding at least a portion of an upper perimeter of the IC carrier and having at least one inclined surface corresponding to the at least one beveled upper edge of the IC carrier. More particularly, the method may also include biasing the IC carrier into alignment within the frame, such as with a body of resilient material.

In another embodiment, the finger sensor may include an IC carrier having a cavity receiving the finger sensing IC therein and having at least one laterally extending projection. The frame may surround at least a portion of an upper perimeter of the IC carrier and have at least one shoulder cooperating with the at least one laterally extending projection of the IC carrier to define at least one upward stop. The biasing member may bias the IC carrier upward within the frame to the at least one upward stop. The frame may comprise an upper portion and a downwardly extending guide portion offset from the upper portion to define the at least one shoulder. Another method aspect is directed to making this embodiment of a finger sensor.

BRIEF DESCRIPTION OF THE DRAWINGS

FIG. 6 is a schematic cross-sectional view of a mounted finger sensor in accordance with the invention.

FIG. 7 is a schematic cross-sectional view of another embodiment of a mounted finger sensor in accordance with the invention.

DETAILED DESCRIPTION OF THE PREFERRED EMBODIMENTS

Figure 1:
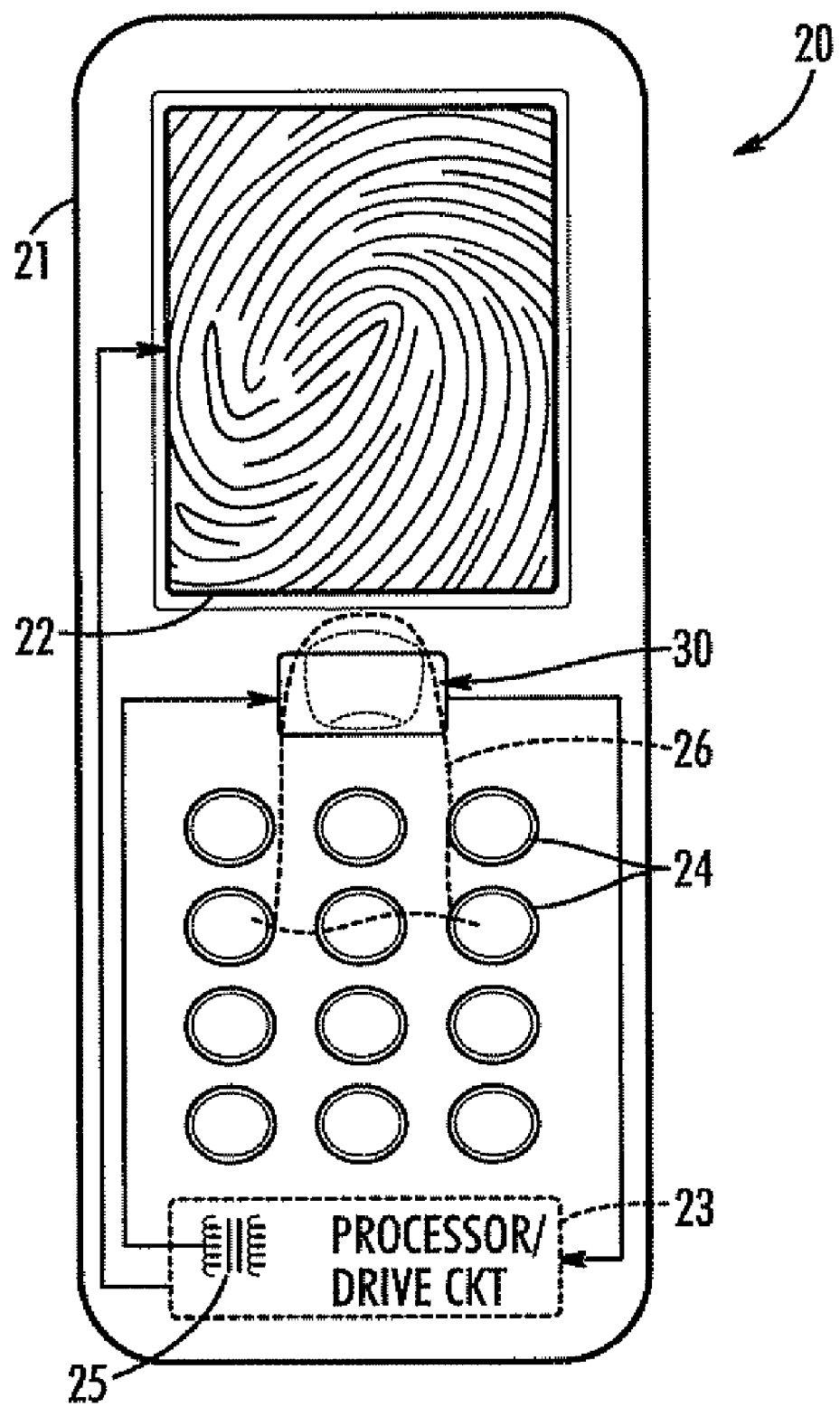
FIG. 1 is a schematic plan view of a cellular telephone including a finger sensor in accordance with the invention.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout and prime notation is used to indicate similar elements in alternative embodiments.

Referring initially to FIGS. 1-4, embodiments of a finger sensor 30 in accordance with the invention are now described. The finger sensor 30 is illustratively mounted on an exposed surface of a candy bar-type cellular telephone 20. The illustrated candy bar-type cellular telephone 20 is relatively compact and does not include a flip cover or other arrangement to protect the finger sensor 30 as may be done in other types of cellular phones. Of course, the finger sensor 30 can also be used with these other more protective types of cell phones as will be appreciated by those skilled in the art. The finger sensor 30 can also be used with other portable and stationary electronic devices as well. The increased durability and ruggedness of the finger sensor 30 will permit its widespread use even when exposed.

The cellular phone 20 includes a housing 21, a display 22 carried by the housing, and processor/drive circuitry 23 also carried by the housing and connected to the display and to the finger sensor 30. An array of input keys 24 are also illustrated provided and used for conventional cellphone dialing and other applications as will be appreciated by those skilled in the art. The processor/drive circuitry 23 also illustratively includes a micro step-up transformer 25 that may be used in certain embodiments to increase the drive voltage for the finger sensor 30 as explained in greater detail below.

The finger sensor 30 may of the slide type where the user's finger 26 slides over the sensing area to generate a sequence of finger images. Alternatively, the finger sensor 30 could be of the static placement type, where the user simply places his finger 26 onto the sensing surface to generate a finger image. Of course, the finger sensor 30 may also include circuitry embedded therein and/or in cooperation with the processor/ drive circuit 23 to provide menu navigation and selection functions as will be appreciated by those skilled in the art.

Figure 2:
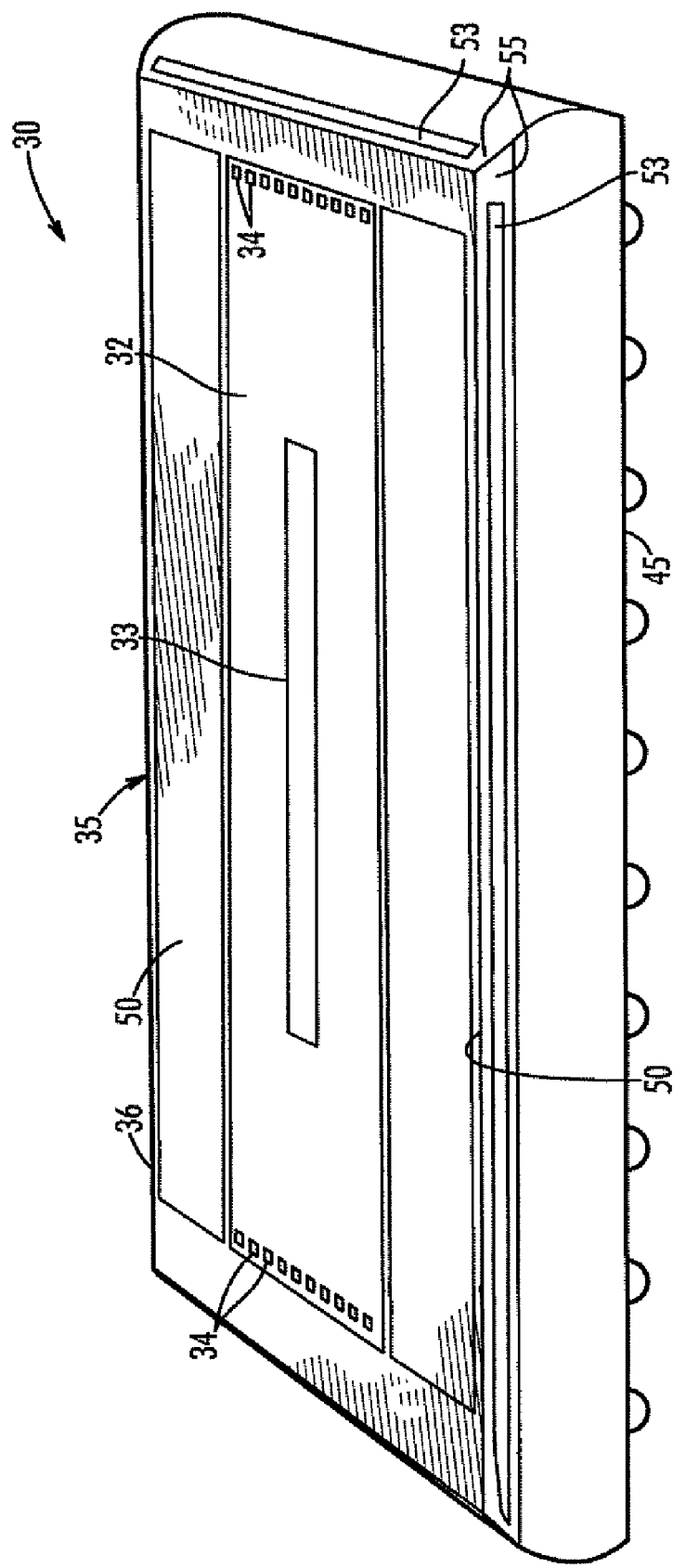
FIG. 2 is an enlarged perspective view of a portion of the finger sensor shown in FIG. 1.
Figure 3:
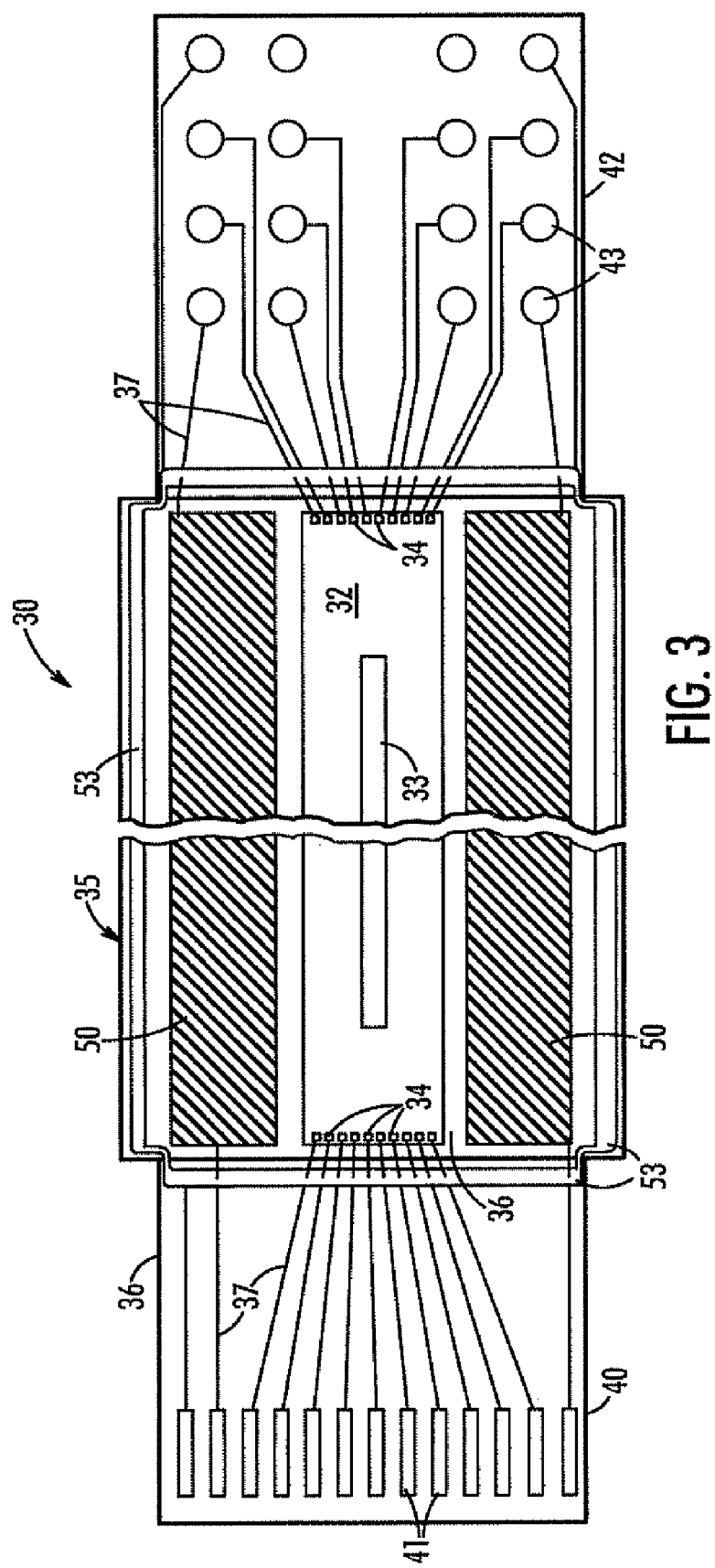
FIG. 3 is a plan view of a portion of the finger sensor as shown in FIG. 1 with alternative embodiments of connector portions being illustrated.

As shown perhaps best in FIGS. 2 and 3, the finger sensor 30 illustratively comprises a finger sensing integrated circuit (IC) 32 including a finger sensing area 33 and a plurality of bond pads 34 adjacent thereto. In particular, the finger sensing IC 32 may comprise a semiconductor substrate having an upper surface, and the finger sensing area 33 may comprise an array of sensing electrodes carried by the upper surface of the semiconductor substrate, such as for electric field finger sensing, for example. Capacitive and/or thermal sensing pixels may also be used, for example.

The finger sensor 30 also includes a flexible circuit 35 coupled to the IC finger sensor. More particularly, the flexible circuit 35 includes a flexible layer 36 covering both the finger sensing area 33 and the bond pads 34 of the IC finger sensor 32. The flexible circuit 32 also includes conductive traces 37 carried by the flexible layer 36 and coupled to the bond pads 34. Of course, the flexible layer 36 preferably comprises a material or combination of materials to permit finger sensing therethrough. Kapton is one such suitable material, although those of skill in the art will readily recognize other suitable materials. Kapton is also hydrophobic providing an advantage that it may permit reading of partially wet or sweating fingers more readily, as any moisture may tend to resist smearing across the image as will be appreciated by those skilled in the art.

As shown perhaps best in FIG. 3, the flexible circuit may comprise one or more connector portions extending beyond the finger sensing area 33 and the bond pads 34. As shown, for example, in the left hand portion of FIG. 3, the connector portion may comprise a tab connector portion 40 wherein the conductive traces 37 terminate at enlarged width portions or tabs 41. With reference to the right hand side of FIG. 3, an alternative or additional connector portion may comprise the illustrated ball grid array connector portion 42, wherein the conductive traces 37 are terminated at bumps or balls 43 as will be appreciated by those of skill in the art.

Figure 4:
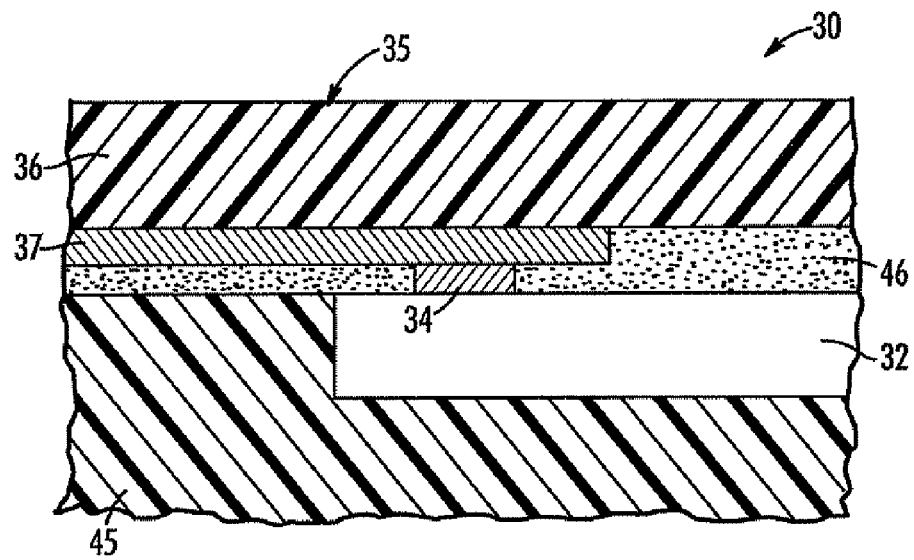
FIG. 4 is an enlarged schematic cross-sectional view through a portion of the finger sensor as shown in FIG. 1.

In the illustrated embodiment, the finger sensor 30 further includes an IC carrier 45 having a cavity receiving the finger sensing IC 32 therein (FIG. 4). The term IC carrier is meant to include any type of substrate or backing material on which or in which the finger sensing IC 32 is mounted. A fill material 46, such as an epoxy, is also illustratively provided between the IC finger sensor 32 and the flexible circuit 35. Accordingly, the IC finger sensor 32 may be readily coupled to external circuitry, and may also enjoy enhanced robustness to potential mechanical damage by finger or other object contact to the sensing area of the IC finger sensor.

The sensor 30 also includes a pair of drive electrodes 50 carried on an outer and/or inner surface of the flexible layer 36 as seen perhaps best in FIGS. 2 and 3. The drive electrodes 50 may be formed of the same conductive material as the conductive traces 37 used for the connector portions 40 or 42 as will also be appreciated by those skilled in the art. In other embodiments, only a single drive electrode 50 or more than two drive electrodes may be used. Even if the drive electrodes 50 are positioned on the inner surface of the flexible layer 36 they can still be driven with a sufficient signal strength to operate. The voltage-boosting micro transformer 25 as shown in FIG. 1, may be used, for example, to achieve the desired drive voltage on the drive electrodes 50 which may be up to about twenty volts for some embodiments.

The finger sensor 30 also includes one or more electrostatic discharge (ESD) electrodes 53 illustratively carried on the outer surface of the flexible layer 36 of the flexible circuit 35. Again the ESD electrodes 53 may be formed of a conductive material applied or deposited onto the flexible layer 36 similar to the conductive traces 37 as will be appreciated by those skilled in the art. The ESD electrodes 53 may be connected to a device ground, not shown, via one or more of the conductive traces 37.

As shown in the illustrated embodiment, the IC carrier 45 has a generally rectangular shape with four beveled upper edges 55 as perhaps best shown in FIG. 2. The beveled edges 55 are underlying or adjacent the ESD electrode 53. Of course, in other embodiments, a different number or only a single beveled edge 55 and adjacent ESD electrode 53 may be used.

Figure 5:
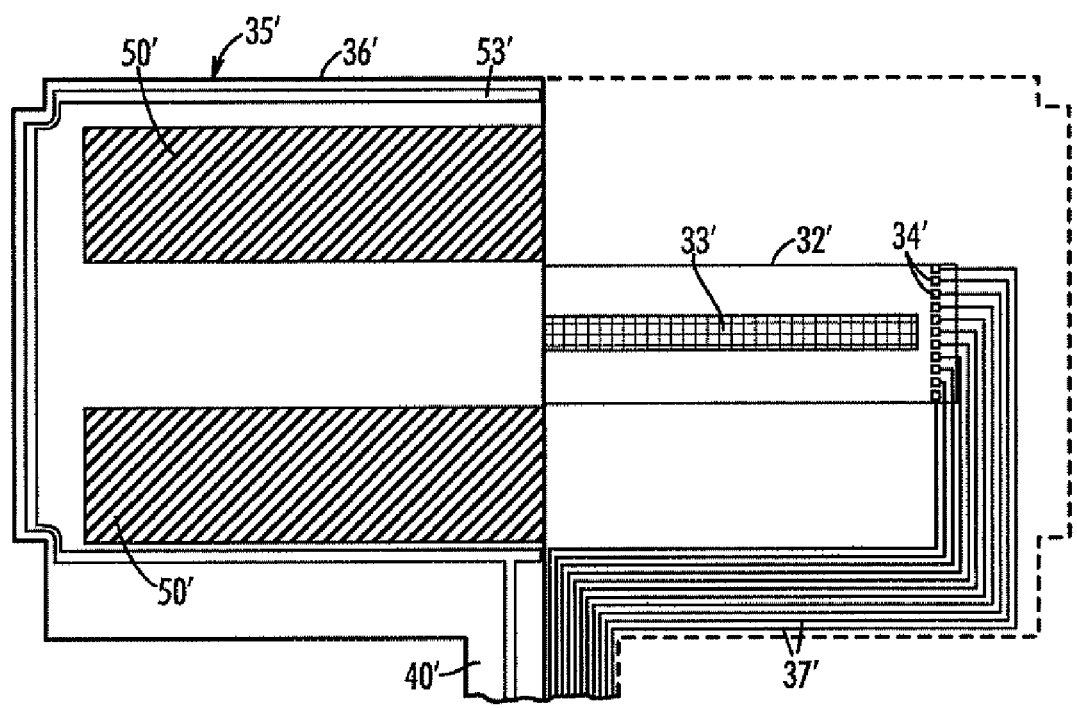
FIG. 5 is a plan view of a portion of a finger sensor in accordance with the invention, similar to FIG. 3, but showing a different embodiment of a connector portion.

Referring now briefly to FIG. 5, another embodiment of flexible circuit 35' suitable for the finger sensor 30 is described. In this embodiment, the tab connector portion 40' extends from the side of the flexible layer 36' rather from an end as shown in FIG. 3. For clarity of illustration, the right hand portion of the flexible layer 36 is not shown. Those other elements of FIG. 5 not specifically mentioned are similar to those corresponding elements described above with reference to FIG. 3 and need no further discussion herein.

Referring now additionally to FIG. 6 mounting of the finger sensor 30 is now described. In the illustrated embodiment, portions of the housing define an integral frame 21 surrounding the upper perimeter of the flexible circuit 35 that, in turn, is carried by the IC carrier 45. This positions the ESD electrodes 53 on the beveled edges of the IC carrier 45. Moreover, the integral frame 21 has inclined surfaces corresponding to the beveled edges of the IC carrier 45. This defines ESD passages 63 to the ESD electrodes 53 as will be appreciated by those skilled in the art. In other words, this packaging configuration will effectively drain off ESD through a small gap 63 between the frame and the flexible layer 36 and without having the ESD electrodes 53 directly exposed on the upper surface of the sensor 30.

The finger sensor 30 may further include at least one electronic component 64 carried by the flexible layer as also explained with reference to FIG. 6. For example, the at least one electronic component 64 may comprise at least one of a discrete component, a light source, a light detector, and another IC. If a light source or light detector is used, it will more likely be positioned so as to be on the upper surface of the sensor. U.S. Published Application No. 2005/0069180, assigned to the assignee of the present invention and the entire contents of which are incorporated herein by reference, discloses various infrared and optical sensors and sources that may be used in combination with the packaging features disclosed herein. Similarly, if another IC comprises another finger sensing IC, for example, it would also be positioned adjacent the IC 32 on the upper surface of the IC carrier 45 as will be appreciated by those skilled in the art. For example, two or more such ICs could be positioned so that their sensing areas were able to capture images end-to-end, even if the chips themselves were staggered. Processing circuitry would stitch the images together widthwise in this example.

The mounting arrangement of FIG. 6 also illustrates another packaging aspect wherein a biasing member in the form of a body of resilient material 62, such as foam, is positioned between the illustrated device circuit board 60 and the IC carrier 45. The resilient body of material 62 permits the finger sensor 30 to be displaced downwardly or into the device to absorb shocks or blows, and causes the sensor to be resiliently pushed back into the desired alignment. The inclined surfaces of the integral frame and beveled edges 55 of the IC carrier 45 also direct the proper alignment of the sensor 30 as it is restored to its upper position as will be appreciated by those skilled in the art.

A slightly different mounting arrangement for the finger sensor 30' is explained with additional reference to FIG. 7, wherein a separate frame 21' is provided that abuts adjacent housing portions 29'. The illustrated frame 21' also sets the finger sensing IC 32' below the level of the adjacent housing portions 29' for additional protection. Also, the biasing member is illustratively in the form of a backing plate 62' that is not attached on all sides and is therefore free to give and provide a returning spring force as will be appreciated by those skilled in the art. The backing plate may carry circuit traces to thereby serves as a circuit board as will be appreciated by those skilled in the art. Those other elements of FIG. 7 are similar to those indicated and described with reference to FIG. 6 and require no further discussion herein.

Yet another embodiment of a finger sensor 30" is now described with reference to FIG. 8. In this embodiment, adjacent housing portions define a frame 21", along one or more sides of the IC carrier 45". The frame 21" includes an upper portion 69" and a downwardly extending guide portion 66" offset from the upper portion that defines an interior step or shoulder 67". This step or shoulder 67", in turn, cooperates with the IC carrier lateral projection or tab 68" to define an upward stop arrangement. This tab 68" may be integrally formed with the IC carrier 45" or comprise a separate piece connected to the main portion of the carrier as will be appreciated by those skilled in the art. Accordingly, the IC carrier 45" may be deflected downwardly, and will be biased back upwardly into its desired operating position along the guide portion 66".

Figure 8:
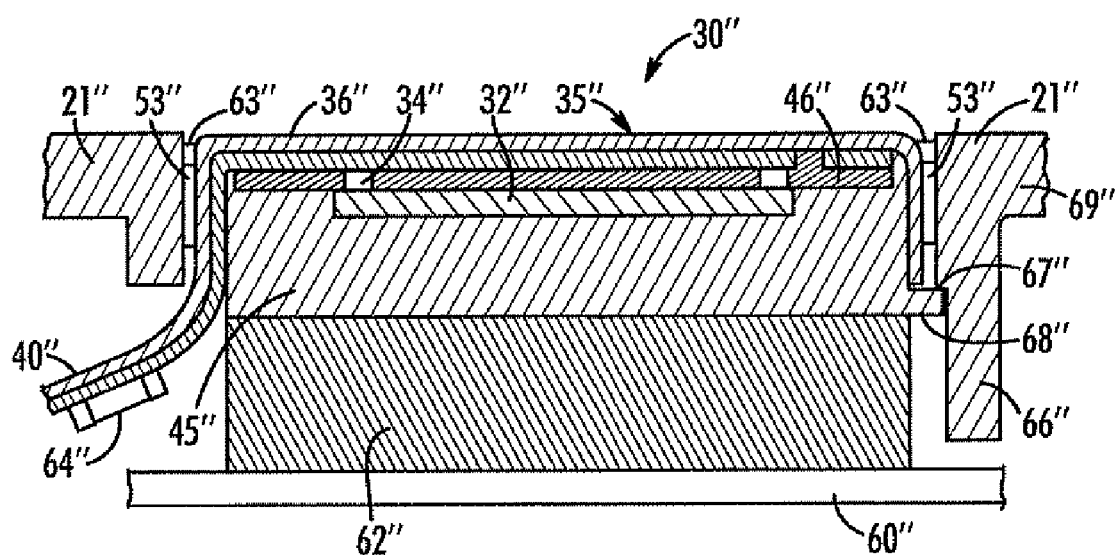
FIG. 8 is a schematic cross-sectional view of yet another embodiment of a mounted finger sensor in accordance with the invention.

The left hand portion of FIG. 8 shows an embodiment wherein the upward stop arrangement is not provided along one side to thereby readily accommodate passage of the connector portion 40". In yet other embodiments, slots could be provided in the flexible circuit 35" to accommodate tabs 68" to project therethrough and provide the upward stop arrangement as well. Those of skill in the art will appreciate other configurations of stop arrangements and mounting.

Figure 9:
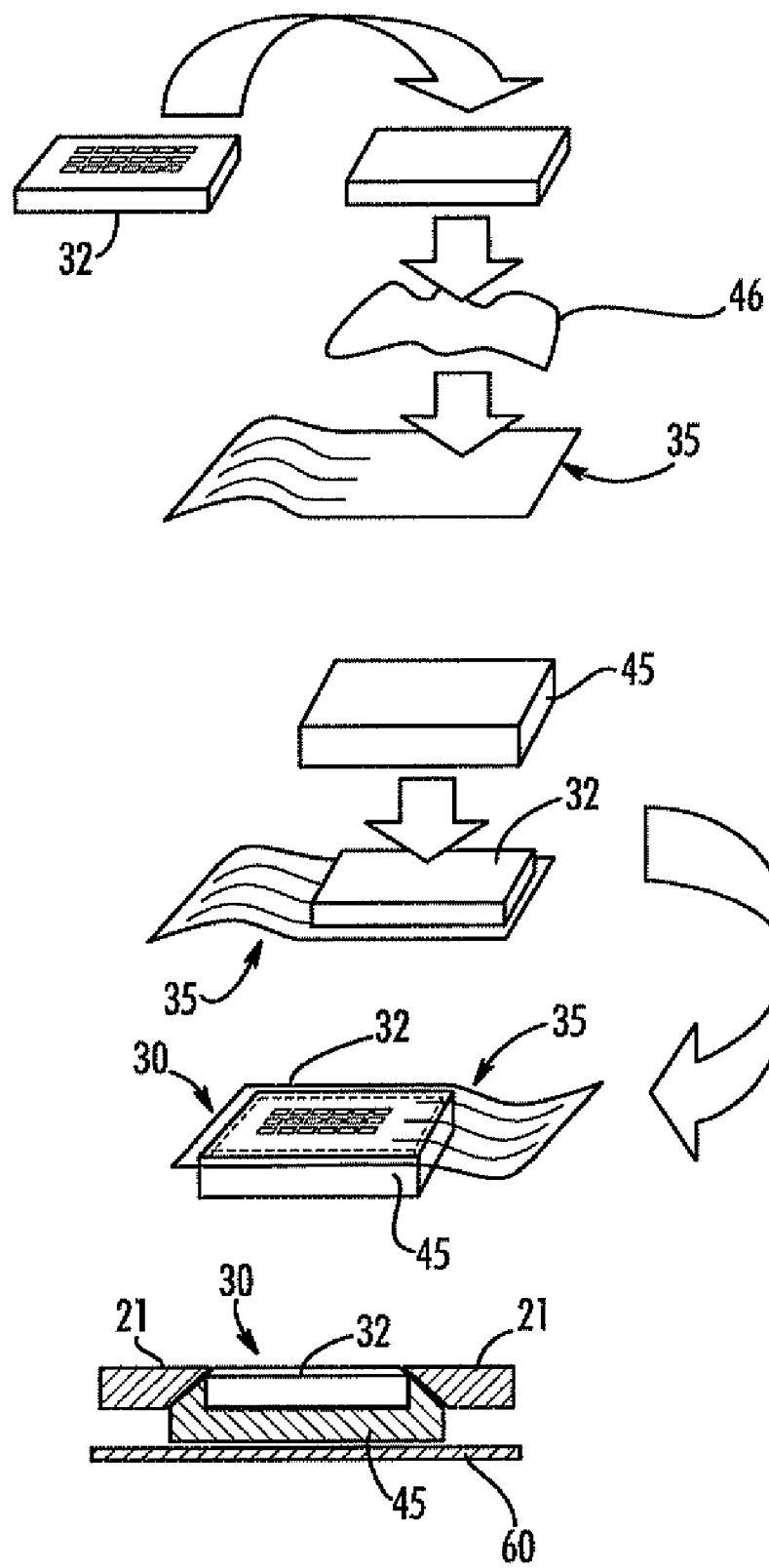
FIG. 9 is a schematic diagram illustrating some of the manufacturing steps for a finger sensor as shown in accordance with the invention.

Referring now additionally to FIG. 9, a method sequence for making the finger sensor 30 is now described. Beginning at the top of the figure, the finger sensing IC 32 is flipped over and coupled to the flexible circuit 35 such as using an epoxy or other suitable fill material 46. Thereafter, as shown in the middle of the figure, the IC carrier 45 is added to the assembly which is then illustratively rotated in the upward facing position. Lastly as shown in the lowermost portion of FIG. 8, the finger sensor 30 is mounted between the frame 21 and the underlying circuit board 60. If the ball grid array connector portion 42 (FIG. 3) is used, this portion can be wrapped and secured underneath the IC carrier 45 as will be readily appreciated by those skilled in the art. This is but one possible assembly sequence, and those of skill in the art will appreciate other similar assembly sequences as well.

The epoxy or glue 46 may be Z-axis conductive glue, and/or it may incorporate resilient energy absorbing properties. The use of an anisotropic conductive material may physically extend the pixel's effective electrical interface away from the die. The conductive material may contact the finger interface itself or it may terminate on the underside of a top protective layer of material over the sensing array. The same anisotropic conductive material may be used to electrically bond the chip's external interface bond pads 34 to conductive traces 37 on the flexible layer 36.

The IC carrier 45 may be a plastic molding or other protective material, that may have resilient energy absorbing properties. It may incorporate multiple layers of different materials, or graded materials having a gradient in one or more physical properties such as stiffness. A stiff (non-stretching) but flexible material layer 36 (like Kapton) over a softer resilient material 46, all on top of the chip's surface 32, spreads the energy of a point impact across a larger area of the chip surface. The resilient material to connect the chip to the circuit board allows the chip—when under force—to move slightly with respect to the circuit board, reducing the stress on the chip. The beveled mechanical interface between the IC carrier 45 and the frame 21 allows movement in both the normal and shear directions with respect to relieve stress. The flexible circuit 35 may also include conductive patterns or traces, not shown, in the area over the sensing array to enhance the RF imaging capability.

The epoxy or glue 46 is a soft resilient layer between the stiffer flexible layer 36 and the very stiff silicon chip surface. This allows the flexible layer 36 to bend inward to reduce scratching from sharp points, and also reduce the transfer of sharp point forces to the silicon.

The IC carrier 45 and any biasing member 62 provide mechanical support to the silicon chip to prevent it from cracking when under stress, and may seal the finger sensing IC 32 and its edges from the environment. The biasing member 62 between the IC carrier 45 and the circuit board 60 can absorb shock energy in both the vertical and shear directions.

The top surface of a semiconductor chip is typically made of multiple layers of brittle silicon oxides and soft aluminum. This type of structure may be easily scratched, cracked, and otherwise damaged when force is applied to a small point on that surface. Damage typically occurs when the pressure applied to the insulating surface oxide propagates through to the aluminum interconnect material directly beneath it. The aluminum deforms removing support from under the oxide, which then bends and cracks. If sufficient force is applied this process may continue through several alternating layers of silicon oxide and aluminum, short-circuiting the aluminum interconnects and degrading the chip's functionality.

In the package embodiments described herein, a sharp object approaching the sensor first contacts the substrate layer (typically Kapton tape). The substrate material deforms and presses into the resilient glue material, spreading the force over a larger area and reducing the maximum force per area transmitted. The spread and diluted force transmitted through the resilient glue now causes the chip to move downward away from the impacting object and into the resilient backing material. Some of the impact energy is converting into motion of the chip and ultimately into compression of the resilient backing material. Finally, when the as chip is forced downward into the resilient backing, the chip will often tilt—encouraging the sharp object to deflect off the sensor. The stiffness of the various layers of resilient material are selected to protect the aluminum interconnects in the silicon chip against the most force possible.

The packaging concepts discussed above make a package that is: durable enough for use on the external surfaces of portable electronic equipment; and maintains good sensing signal propagation, resulting in good quality sensor data. The embodiments are relatively inexpensive and straightforward to manufacture in high volume.

Now reviewing a number of the possible advantages and features of the finger sensors disclosed herein, significant improvements in scratch resistance can be achieved by combining a surface material like Kapton that is relatively stiff and difficult to tear, with a softer glue material underneath.

With this structure, when a sharply pointed object comes into contact, the surface material can indent, reducing the initial impact, spreading the force across a larger area, and preventing the point from penetrating the surface. When the object is removed, the resilient materials return to their original shapes.

A flexible substrate with a smooth surface and a low coefficient of friction (such as a Kapton tape) will help resist abrasion. The resilient structure described above can also improve abrasion resistance by preventing the abrasive particles from cutting into the surface. The resilient structure described above also provides several levels of protection against impacts of various intensities.

When a portable device like a cellphone is dropped, a shearing force is applied to any structure that interconnects the case with the internal circuit boards. In a sensor that is soldered to the internal circuit board and projects through a hole in the case, the full shearing force is applied to the sensor and its circuit board interconnects. In the package described above, the shear force is absorbed by the resilient material that may mechanically connect the sensor to the circuit board. If the shear force is extreme, the beveled sensor will slip under the case, converting the shear force into normal compression of the resilient backing material. When the impact event is over the sensor will return to its normal position.

The package described can also provide protection against continuous pressure. When pressure is applied, the resilient backing compresses, allowing the sensor to retract from the surface a small distance. In many situations this will allow the case to carry more of the force, reducing the force on the sensor.

In the packaging described here, the flexible substrate material also acts as an ESD (electrostatic discharge) barrier between the chip and its environment, preventing ESD from reaching the sensitive electronic devices on the chip. Accordingly, leakage current tingle may be significantly reduced or eliminated. A 1 mil Kapton layer provides an 8.6 Kv withstand capability. The ESD electrodes can capture discharges at higher voltages. The maximum voltage over the drive electrodes prior to air breakdown to the ESD electrode is 7.5 Kv. The distance from the farthest point of the drive electrode to the ESD capture electrodes is 2.5 mm, and the dry air dielectric breakdown is 3 Kv/mm. Accordingly, even with a clean surface (worst case) the ESD would discharged to the ESD capture electrode before penetrating the Kapton dielectric layer. In addition, over the array is provided 1 mil of Kaptom, plus 1 mil of epoxy, plus 2.5 microns of SiN. This may provide about 14.1 Kv dielectric withstand over the pixel array. This may eliminate a requirement for outboard ESD suppressors and associated circuitry.

Some mechanical durability data is provided below in TABLE 1. In particular, three devices are compared: a model 1510 small slide IC with a nitride coating and no adhesive, a 1510 IC with a polyimide coating and no adhesive, and a model 2501 large slide IC with a Kapton layer and acrylic adhesive/filler. The drill rod scratch and pencil scratch tests are ANSI tests. The other three tests are self-explanatory, and it can be seen that the Kapton/filler device enjoys a considerable advantage in terms of mechanical robustness.

TABLE 1

| Substrate | Bare Nitride | 7 μm Polyimide | 25 μm Kapton |
| --- | --- | --- | --- |
| Adhesive | N/A | N/A | Acrylic |
| Test Die | 1510 | 1510 | 2501 Ni |
| Drill Rod Scratch (grams) | <50 | 225 | 350 |
| Pencil Scratch (hardness) (5) | N/A | HB | 6 H |
| 6.5 mm Ball Impact (gr cm) | 234 | 234 | 488 |
| 1.0 mm Ball Impact (gr cm) | <75 | <13 | 195 |
| Rock Tumbler (hrs) | N/A | <8 | 67 |

All or part of the desired circuitry may be included and mounted on the flexible circuit. The customer interface cold then be a simple standard interface, such as a USB connector interface. LEDs can be included on the flexible circuit, or electroluminescent sources can be added as printed films. Organic LEDs can be printed as films on the underside of the flexible circuit.

Other features and advantages in accordance with the invention may be understood with reference to copending applications entitled: FINGER SENSOR INCLUDING FLEXIBLE CIRCUIT AND ASSOCIATED METHODS, and FINGER SENSOR INCLUDING ENHANCED ESD PROTECTION AND ASSOCIATED METHODS, and filed concurrently herewith and the entire disclosures of which are incorporated herein by reference. Accordingly, many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that other modifications and embodiments are intended to be included within the scope of the appended claims.

That which is claimed is:

1. A finger sensor comprising:
   a finger sensing integrated circuit (IC) comprising a finger sensing area;
   an IC carrier having a cavity receiving said finger sensing IC therein and having at least one laterally extending projection;
   a frame surrounding at least a portion of an upper perimeter of said IC carrier and having at least one shoulder cooperating with said at least one laterally extending projection of said IC carrier to define at least one upward stop; and
   a biasing member for biasing said IC carrier upward within said frame to said at least one upward stop.

2. A finger sensor according to claim 1 wherein said biasing member comprises at least one resilient body for biasing said IC carrier upward within said frame.

3. A finger sensor according to claim 1 wherein said frame comprises an upper portion and a downwardly extending guide portion offset from the upper portion to define the at least one shoulder.

4. A finger sensor according to claim 1 further comprising a flexible circuit coupled to said finger sensing IC, and extending between said IC carrier and adjacent portions of said frame.

5. A finger sensor according to claim 4 wherein said flexible circuit comprises at least one connector portion extending beyond said finger sensing area and said plurality of bond pads.

6. A finger sensor according to claim 5 wherein said at least one connector portion comprises at least one tab connector portion.

7. A finger sensor according to claim 5 wherein said at least one connector portion comprises at least one ball grid array connector portion.

8. A finger sensor according to claim 4 wherein said finger sensing IC further comprises at least one bond pad adjacent said finger sensing area; and wherein said flexible circuit comprises a flexible layer, and at least one conductive trace carried thereby and coupled to said at least one bond pad.

9. A finger sensor according to claim 8 further comprising at least one drive electrode carried by said flexible layer.

10. A finger sensor according to claim 8 further comprising at least one electrostatic discharge (ESD) electrode carried by said flexible layer.

11. A finger sensor according to claim 8 wherein further comprising a fill material between said finger sensing IC and said flexible circuit.

12. A finger sensor according to claim 8 further comprising at least one electronic component carried by said flexible circuit.

13. A finger sensor according to claim 12 wherein said at least one electronic component comprises at least one of a discrete component, a light source, a light detector, and another IC.

14. A finger sensor according to claim 12 wherein said another IC comprises at least one other finger sensing IC.

15. A finger sensor according to claim 1 wherein said finger sensing IC comprises a semiconductor substrate having an upper surface; and wherein said finger sensing area comprises an array of sensing electrodes carried by the upper surface of said semiconductor substrate.

16. A method for making a finger sensor comprising:
providing a finger sensing integrated circuit (IC) comprising a finger sensing area;
positioning the IC finger sensor into a cavity of an IC carrier having at least one laterally extending projection;
positioning a frame surrounding at least a portion of an upper perimeter of the IC carrier and having at least one shoulder cooperating with the at least one laterally extending projection of the IC carrier to define an upward stop; and
biasing the IC carrier upward within the frame to the upward stop.

17. A method according to claim 16 wherein biasing comprises positioning at least one resilient body for biasing the IC carrier upward within the frame.

18. A method according to claim 16 wherein the frame comprises an upper portion and a downwardly extending guide portion offset from the upper portion to define the at least one shoulder.

19. A method according to claim 16 further comprising a flexible circuit coupled to the IC finger sensor, and extending between the IC carrier and adjacent portions of the frame.

20. A method according to claim 19 wherein the flexible circuit comprises at least one connector portion extending beyond the finger sensing area and the plurality of bond pads.

21. A method according to claim 16 wherein the IC finger sensor comprises a semiconductor substrate having an upper surface; and wherein the finger sensing area comprises an array of sensing electrodes carried by the upper surface of the semiconductor substrate.

* * * * *

UNITED STATES PATENT AND TRADEMARK OFFICE
CERTIFICATE OF CORRECTION

PATENT NO. : 7,599,532 B2 Page 1 of 1
APPLICATION NO. : 12/206183
DATED : October 6, 2009
INVENTOR(S) : Setlak et al.

It is certified that error appears in the above-identified patent and that said Letters Patent is hereby corrected as shown below:

Column 2, Line 6  Delete: "that"
Insert: --than--

Column 3, Line 37  Delete: "another"
Insert: --other--

Column 4, Line 65  Delete: "may of"
Insert: --may be of--

Column 6, Line 20  Delete: "rather from"
Insert: --rather than from--

Column 7, Line 15  Delete: "serves"
Insert: --serve--

Column 8, Line 51  Delete: "as"

Column 9, Line 44  Delete: "discharged"
Insert: --discharge--

Column 9, Line 46  Delete: "Kaptom"
Insert: --Kapton--

Column 10, Line 13  Delete: "cold"
Insert: --could--

Signed and Sealed this

Twenty-eighth Day of September, 2010

David J. Kappos
*Director of the United States Patent and Trademark Office*